(12) United States Patent
Chun et al.

(10) Patent No.: US 11,200,668 B2
(45) Date of Patent: Dec. 14, 2021

(54) METHODS AND DEVICES FOR GRADING A TUMOR

(71) Applicant: SHANGHAI UNITED IMAGING INTELLIGENCE CO., LTD., Shanghai (CN)

(72) Inventors: Qiuping Chun, Shanghai (CN); Feng Shi, Shanghai (CN); Yiqiang Zhan, Shanghai (CN)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 130 days.

(21) Appl. No.: 16/657,355

(22) Filed: Oct. 18, 2019

(65) Prior Publication Data

US 2020/0273162 A1 Aug. 27, 2020

(30) Foreign Application Priority Data

Feb. 27, 2019 (CN) .......................... 201910146428.X

(51) Int. Cl.
*G06N 3/08* (2006.01)
*G06K 9/62* (2006.01)
(Continued)

(52) U.S. Cl.
CPC ........ *G06T 7/0012* (2013.01); *G06K 9/00147* (2013.01); *G06K 9/6227* (2013.01);
(Continued)

(58) Field of Classification Search
CPC combination set(s) only.
See application file for complete search history.

(56) References Cited

U.S. PATENT DOCUMENTS

| 2006/0245631 A1* | 11/2006 | Levenson | ............ | G06K 9/6284 |
| | | | | 382/133 |
| 2008/0267483 A1* | 10/2008 | Zhan | ........................ | G06T 7/33 |
| | | | | 382/131 |

(Continued)

FOREIGN PATENT DOCUMENTS

| CN | 101234026 A | 8/2008 |
| CN | 104881568 A | 9/2015 |

(Continued)

OTHER PUBLICATIONS

Chinese Patent Office, Office Action dated Jun. 12, 2020, in Application No. 201910146428.X.

(Continued)

*Primary Examiner* — Tsung Yin Tsai
(74) *Attorney, Agent, or Firm* — Faegre Drinker Biddle & Reath LLP

(57) ABSTRACT

Method and system for grading a tumor. For example, a system for grading a tumor comprising: an image obtaining module configured to obtain a pathological image of a tissue to be examined; a snippet obtaining module configured to obtain one or more snippets having one or more sizes from the pathological image; an analyzing module configured to obtain one or more classification features based on at least analyzing the one or more snippets using one or more selected trained detection models of the analyzing module, wherein each selected trained detection model is configured to identify one or more classification features; and an outputting module configured to determine a tumor identification result based on at least the one or more classification features and output the tumor identification result.

17 Claims, 13 Drawing Sheets

(51) Int. Cl.
  *G06T 7/00* (2017.01)
  *G06K 9/00* (2006.01)

(52) U.S. Cl.
  CPC ............ *G06K 9/6256* (2013.01); *G06N 3/08* (2013.01); *G06T 2207/20081* (2013.01); *G06T 2207/30024* (2013.01); *G06T 2207/30096* (2013.01)

(56) References Cited

U.S. PATENT DOCUMENTS

| | | | | |
|---|---|---|---|---|
| 2010/0075373 | A1* | 3/2010 | Hoyt | G06K 9/00147 435/40.5 |
| 2014/0093150 | A1* | 4/2014 | Zalev | A61B 5/725 382/131 |
| 2017/0091937 | A1* | 3/2017 | Barnes | G06K 9/6228 |
| 2020/0167586 | A1* | 5/2020 | Gao | G06K 9/6257 |
| 2020/0211692 | A1* | 7/2020 | Kalafut | G06T 7/0012 |
| 2021/0019342 | A1* | 1/2021 | Peng | G06F 16/583 |
| 2021/0033599 | A1* | 2/2021 | Kiyuna | G16H 30/40 |
| 2021/0137634 | A1* | 5/2021 | Lang | A61B 90/13 |

FOREIGN PATENT DOCUMENTS

| | | |
|---|---|---|
| CN | 104933711 A | 9/2015 |
| CN | 108573490 A | 9/2018 |
| CN | 108717554 A | 10/2018 |
| CN | 109271969 A | 1/2019 |

OTHER PUBLICATIONS

Zhang, Jialin, *Securities Investment Artificial Intelligence*, p. 63 in section entitled "Understanding Artificial Intelligence," published Jan. 2017, Beijing, China.

Zhou, Caicun (Editor), *Oncology*, Chapter 24 ("Central Nerve Tumor"), pp. 557-563, published Jan. 2010, Shanghai, China.

Chinese Patent Office, Office Action dated Feb. 17, 2020, in Application No. 201910146428.X.

* cited by examiner

METHODS AND DEVICES FOR GRADING A TUMOR

1. CROSS-REFERENCES TO RELATED APPLICATIONS

This application claims priority to Chinese Patent Application No. 201910146428.X, filed Feb. 27, 2019, incorporated by reference herein for all purposes.

2. BACKGROUND OF THE INVENTION

Certain embodiments of the present invention are directed to image processing. More particularly, some embodiments of the invention provide systems and methods for grading a tumor. Merely by way of example, some embodiments of the invention have been applied to diagnosing a medical image. But it would be recognized that the invention has a much broader range of applicability.

Gliomas, also known as Glioblastomas, are the most common primary malignant brain tumors produced by brain and spinal glial cancer, accounting for approximately 46% of intracranial tumors. In 1998, the World Health Organization announced the ranking of mortality according to the severity of mortality, within which, malignant Glioma is listed as the second leading cause of death in patients under 34-year-old and is the third leading cause of death in cancer patients aged 35-54 years old. Patients with benign Glioblastoma are known to see slow growth with a long course of disease, with the average time from symptom onset to visitation being about two years. In contrast, malignant Gliomas grow fast and have short course of disease, with most having under 3 months from the onset of symptoms to the visitation, leading to the health of 70%-80% of endangered patients within half a year (e.g., from symptom onset).

The clinical symptoms of brain glioma can be divided into two categories, one includes symptoms of increased intracranial pressure, such as headache, vomiting, vision loss, diplopia, mental symptoms, etc., the second includes tumor compression, infiltration, focal lesion symptoms corresponding to destruction of brain tissue, early manifestations of irritating symptoms such as localized epilepsy, and later manifestations of neurological deficit symptoms such as sputum. When the above symptoms occur, a patient is to attend a hospital promptly.

A traditional method for diagnosing a Glioblastoma type includes: (1) biopsy, (2) sectioning, (3) staining, (4) recognizing by an experienced doctor, and (5) diagnosing a result. Biopsy, also known as surgical pathology, refers to the technique of taking out diseased tissue from the patient by cutting, clamping or puncture, and performing pathological examination the taken out diseased tissue. Commonly, the tissue taken out by biopsy is cut into very thin slices, such as after formaldehyde fixation, dehydration, paraffin embedding, etc., and then can be made into a slice for examination under a microscope, such as using steps of patching, baking, dewaxing, hydration, dyeing, etc. In some use cases, the purpose of staining is to render different structures within the cell tissue to appear in different colors for ease of viewing. For example, after staining, different organelles, their inclusions, and the different types of cell tissues can be displayed distinctly. Once prepared, a pathologist typically first observes the specimen with the naked eye, then observes the specimen under a microscope, and then provide a diagnostic result according to the comprehensive analysis of the taken pathological tissue. Finally, the pathologist gives a pathology report based on the observations and the analysis.

The described traditional method for diagnosing a Glioblastoma type in a pathological image (or section thereof) has at least the following drawbacks: (1) some tumor features are not easy to identify, such as in cases with nuclear divisions, which may be missed by inexperienced doctors while still requiring senior doctors excessive time to identify (e.g., by thoroughly analyzing each image one by one); and (2) for each slide showing a slice of the tumor, a doctor is typically trained to gradually narrow down the search target until a feature is located. As during this process, different doctors have different ways and preferences of viewing (e.g., selection and/or displaying of viewing areas), inconsistent diagnosis between doctors and/or biopsy samples are common.

There is therefore a need for improved methods and systems for grading a tumor, such as a tumor type, with improved accuracy.

3. BRIEF SUMMARY OF THE INVENTION

Certain embodiments of the present invention are directed to image processing. More particularly, some embodiments of the invention provide systems and methods for grading a tumor. Merely by way of example, some embodiments of the invention have been applied to diagnosing a medical image. But it would be recognized that the invention has a much broader range of applicability.

In various embodiments, a system for grading a tumor includes an image obtaining module configured to obtain a pathological image of a tissue to be examined; a snippet obtaining module configured to obtain one or more snippets having one or more sizes from the pathological image; an analyzing module configured to obtain one or more classification features based on at least analyzing the one or more snippets using one or more selected trained detection models of the analyzing module, wherein each selected trained detection model is configured to identify one or more classification features; and an outputting module configured to determine a tumor identification result based on at least the one or more classification features and output the tumor identification result.

In some embodiments, the snippet obtaining module is configured to obtain one or more snippets having one or more sizes from the pathological image based on at least one or more input or specified sizes.

In some embodiments, the system further includes a model selecting module configured to provide one or more detection model sets each including one or more trained detection models. In some examples, the analyzing module is configured to use a selected detection model set selected from the one or more detection model sets for obtaining the one or more classification features, the selected detection model set including the one or more selected trained detection models, each of the one or more classification features corresponding to one of the one or more selected trained detection models.

In some embodiments, the model selecting module is further configured to select the selected detection model set from the one or more detection model sets based on at least an input or specified body part.

In some embodiments, the snippet obtaining module is further configured to: determine the one or more sizes of the one or more snippets based on at least one of the one or more selected trained detection models; and obtain the one or more snippets having the determined one or more sizes from the pathological image.

In some embodiments, the snippet obtaining module is further configured to receive size information associated with the one or more selected trained detection models from the analyzing module; determine the one or more sizes of the one or more snippets based on at least the one or more selected trained detection models; obtain the one or more snippets having the determined one or more sizes from the pathological image; and output the obtained one or more snippets to the analyzing module.

In some embodiments, the snippet obtaining module includes a microscopic device.

In some embodiments, the analyzing module is configured to obtain a first classification feature (e.g., egg-shaped cell or nuclear division) associated with a first snippet of a first size using a first trained detection model; and to obtain a second classification feature (e.g., cell necrosis or vascular endothelial cell proliferation) associated with a second snippet of a second size using a second trained detection model, the second size being larger than the first size.

In some embodiments, the tumor identification result includes at least one selected from a group consisting of a tumor type and a tumor class.

In some examples, the system further includes a model training module configured to: receive a training image having at least a first training snippet of a first size and a second training snippet of a second size; receive one or more classification features associated with the training image, the one or more classification features includes a first classification feature associated with the first training snippet of the first size and a second classification feature associated with the second training snippet of the second size; and train one or more detection models based at least in part on the one or more classification features to generate the one or more trained detection models; wherein a first trained detection model of the one or more trained detection models corresponds to the first classification feature and the first size; and wherein a second trained detection model of the one or more trained detection models corresponds to the second classification feature and the second size.

In various embodiments, a computer-implemented method for grading a tumor includes: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module.

In some embodiments, the method further includes obtaining one or more snippets having one or more sizes from the pathological image using the snippet obtaining module based on at least one or more input or specified sizes.

In some embodiments, obtaining one or more classification features based on at least analyzing the one or more snippets using one or more selected trained detection models of an analyzing module includes: selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

In some embodiments, the method further includes selecting the detection model set based on at least an input or specified body part using the model selecting module.

In some embodiments, the method further includes determining the one or more sizes of the one or more snippets based on at least one of the one or more selected trained detection models; and obtaining the one or more snippets having the determined one or more sizes from the pathological image.

In some embodiments, the method further includes receiving size information associated with the one or more selected trained detection models from the analyzing module; determining the one or more sizes of the one or more snippets based on at least the one or more selected trained detection models; obtaining the one or more snippets having the determined one or more sizes from the pathological image; and outputting the obtained one or more snippets to the analyzing module.

In some embodiments, determining a tumor identification result based on at least the one or more classification features and outputting the tumor identification result using an outputting module includes: determining the tumor identification result including at least one selected from a group consisting of a tumor type and a tumor class based on at least the one or more classification features and outputting the tumor identification result using the outputting module.

In various embodiments, a non-transitory computer-readable medium with instructions stored thereon, that when executed by a processor, perform the processes including: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module.

In some embodiments, the non-transitory computer-readable medium, when executed, further perform the process of obtaining one or more snippets having one or more sizes from the pathological image using the snippet obtaining module based on at least one or more input or specified sizes.

In some embodiments, obtaining one or more classification features based on at least analyzing the one or more snippets using one or more selected trained detection models of an analyzing module includes: selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

In some embodiments, the non-transitory computer-readable medium, when executed, further perform the process of selecting the selected detection model set based on at least an input or specified body part using the model selecting module.

In some embodiments, the non-transitory computer-readable medium, when executed, further perform the processes including: determining the one or more sizes of the one or more snippets based on at least one of the one or more selected trained detection models; and obtaining the one or more snippets having the determined one or more sizes from the pathological image.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Figure 1A:
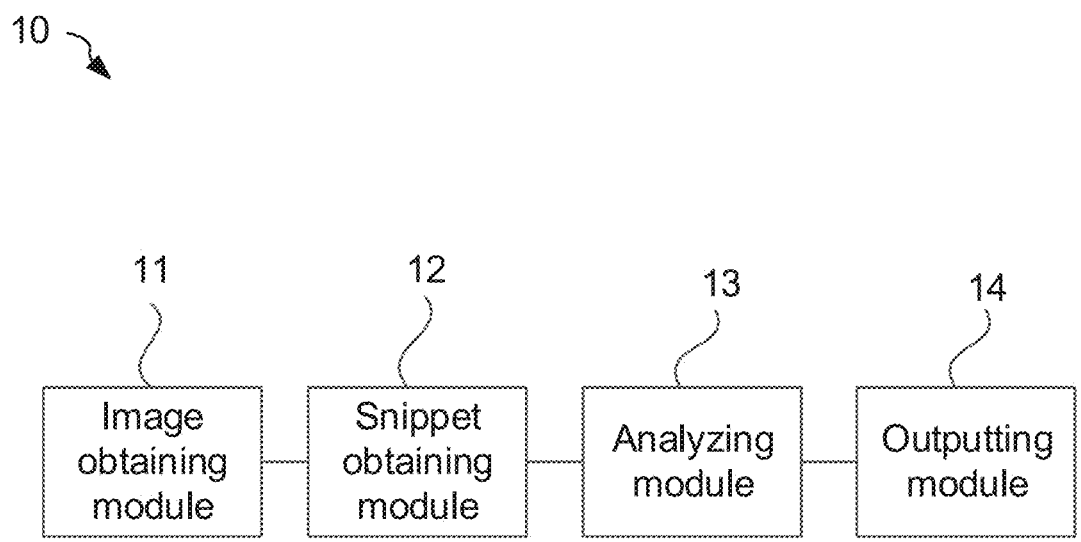
FIG. 1A is a simplified diagram showing a system for grading a tumor, according to some embodiments of the present invention.

Certain embodiments of the present invention are directed to image processing. More particularly, some embodiments of the invention provide systems and methods for grading a tumor. Merely by way of example, some embodiments of the invention have been applied to diagnosing a medical image. But it would be recognized that the invention has a much broader range of applicability.

Embodiments of the present invention disclose a tumor determination system, method, and storage medium. In some examples, the technical solutions described in the embodiments of the invention can help reduce problems pertaining determining tumor types relying on the experience of a doctor, which conventionally results to low accuracy with room for improvement. In certain examples, the determining of the tumor type is performed automatically. In various examples, the system is configured to determine (e.g., automatically) a tumor (e.g., a tumor type and/or class) according to a pathologist's diagnosis procedures.

Pathological sections are considered as the gold standard for doctors to diagnose a condition pertaining an inclusion of a tumor. For example, a pathologist typically gives a diagnosis by examining the patient's biological tissue sample, such as after performing detailed analysis on the tissue sample to obtain a tumor type or class. Taking brain glioma as an example, after obtaining a pathological image of the tumor, a pathologist can observe the quantity of "egg-shaped" cell units, nuclear divisions, cell necrosis and vascular endothelial cell proliferations in the pathological image, and further determine a tumor type and tumor class. In various embodiments, the described methods and systems are based on at least a pathologist's diagnosis procedure to achieve automatic determining of tumor type and class. Tumor class may be referred to as tumor level or tumor stage.

In certain embodiments, a system for grading a tumor includes an image obtaining module configured to obtain a pathological image of a tissue to be examined; a snippet obtaining module configured to obtain one or more snippets having one or more sizes from the pathological image; an analyzing module configured to obtain one or more classification features based on at least analyzing the one or more snippets using one or more selected trained detection models of the analyzing module, wherein each selected trained detection model is configured to identify one or more classification features; and an outputting module configured to determine a tumor identification result based on at least the one or more classification features and output the tumor identification result.

In certain examples, the snippet obtaining module is configured to obtain one or more snippets having one or more sizes from the pathological image based on at least one or more input or specified sizes.

In certain examples, the system further includes a model selecting module configured to provide one or more detection model sets each including one or more trained detection models; wherein the analyzing module is configured to use a selected detection model set selected from the one or more detection model sets for obtaining the one or more classification features, the selected detection model set including the one or more selected trained detection models, each of the one or more classification features corresponding to one of the one or more selected trained detection models.

In certain examples, the model selecting module is further configured to select the selected detection model set from the one or more detection model sets based on at least an input or specified body part.

In certain examples, the snippet obtaining module is further configured to: determine the one or more sizes of the one or more snippets based on at least one of the one or more selected trained detection models; and obtain the one or more snippets having the determined one or more sizes from the pathological image.

In certain examples, the snippet obtaining module includes a microscopic device.

In certain examples, the tumor identification result includes at least one selected from a group consisting of a tumor type and a tumor class.

In certain embodiments, a computer-implemented method for grading a tumor includes: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module.

In certain examples, obtaining one or more classification features based on at least analyzing the one or more snippets using one or more selected trained detection models of an analyzing module includes selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

In certain embodiments, a non-transitory computer-readable medium with instructions stored thereon, that when executed by a processor, perform the processes including: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module.

FIG. 1A is a simplified diagram showing a system 10 for grading a tumor, according to some embodiments of the present invention. This diagram is merely an example, which should not unduly limit the scope of the claims. One of ordinary skill in the art would recognize many variations, alternatives, and modifications. In some examples, the system 10 includes an image obtaining module 11, a snippet obtaining module 12, an analyzing module 13, and an outputting module 14. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the image obtaining module 11 is configured to obtain or acquire an image (e.g., a pathological image), such as an image of a tissue to be inspected or examined. In various embodiments, the snippet obtaining module 12 (which may be referred to as a partial image obtaining module) is configured to obtain, acquire, or extract one or more snippets from the image of the tissue to be inspected. In various examples, each snippet is smaller or equal to the image in size or volume. In some examples, the one or more snippets have one or more sizes. A snippet may also be referred to as a partial image, a sub-image, a subimage, a local image, or an analysis image. In various embodiments, the analyzing module 13 is configured to analyze the one or more snippets based on at least one or more selected trained detection models to obtain one or more (e.g., a plurality of) classification features. In some embodiments, each of the one or more selected trained detection model is configured to determine one or more classification features. A detection model may also be referred to as an analyzing model. In various embodiments, the outputting module 14 is configured to determine and output a tumor identification result based on at least the one or more classification features.

In some embodiments, the image (e.g., the pathological image) is a CT image or a MR image of the tissue to be examined, or a microscopic image of a slice of the tissue to be examined (e.g., as shown in FIGS. 3 and 4A-4F).

Figure 1B:
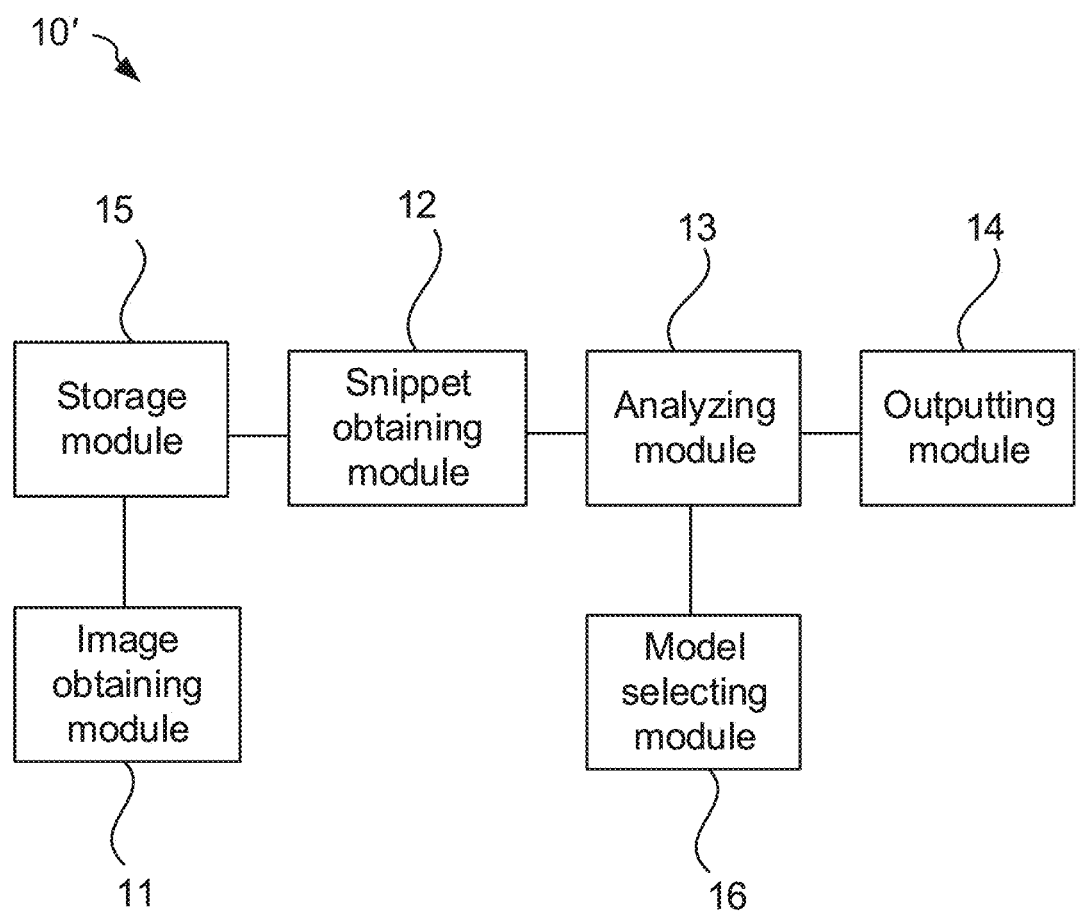
FIG. 1B is a simplified diagram showing another system for grading a tumor, according to some embodiments of the present invention.

FIG. 1B is a simplified diagram showing another system 10' for grading a tumor, according to some embodiments of the present invention. This diagram is merely an example, which should not unduly limit the scope of the claims. One of ordinary skill in the art would recognize many variations, alternatives, and modifications. In some examples, the system 10' includes the image obtaining module 11, the snippet obtaining module 12 (may also be referred to as an analysis-image obtaining module), the analyzing module 13, the outputting module 14, and notably additional to that of system 10, a storage module 15 and a model selecting module 16. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the storage module 15 is configured to store one or more images (e.g., pathological images) or one or more snippets (e.g., analysis images).

In various embodiments, the image obtaining module 11 includes a reading module configured to receive and/or read the pathological image of the tissue to be examined. In some embodiments, the image obtaining module 11 is configured to send the pathological image to the storage module 15 and/or store the pathological image in the storage module 15. In certain embodiments, the image obtaining module 11 includes a microscopic device (e.g., a microscope) configured to acquire (e.g., directly) the pathological image of the tissue to be examined. In some examples, when the image obtaining module 11 includes a microscope device, the system for grading a tumor includes an image reading module for receiving the pathological image of the tissue to be examined from the microscope, and further including a storage module for storing the pathological image.

Figure 2A:
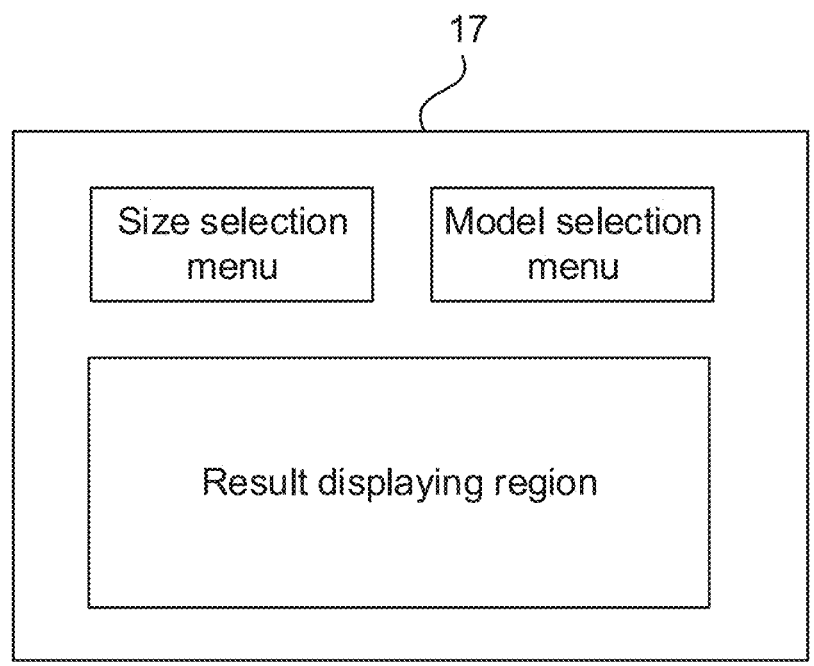
FIG. 2A is a simplified diagram showing an interface, according to some embodiments of the present invention.

FIG. 2A is a simplified diagram showing an interface 17, according to some embodiments of the present invention. This diagram is merely an example, which should not unduly limit the scope of the claims. One of ordinary skill in the art would recognize many variations, alternatives, and modifications. In some examples, the interface 17 includes a size selection menu, a model selection menu, and a result displaying region. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In certain embodiments, a system for grading a tumor (e.g., system 10) is configured to receive one or more sizes inputted or entered by a user, such as via a size selection menu or box in an interface (e.g., a human-computer interaction) 17. In some examples, the one or more sizes is inputted before an image obtaining module 12 extracts one or more analysis images from a pathological image. In certain embodiments, the image obtaining module 12 is configured to obtain the one or more analysis images based on at least the one or more sizes inputted by the user. In various examples, one or more default sizes are set (e.g., predetermined), which when set, the snippet obtaining module 12 is configured to obtain the one or more snippets from the pathological image based on at least the one or more default sizes. In certain examples, the snippet obtaining module 12 is further configured to store the obtained one or more snippets in the storage module 15, such as in a designated storage space. In various embodiments, the use of one or more default sizes simplifies and accelerates the process of obtaining snippet(s).

Figure 3:
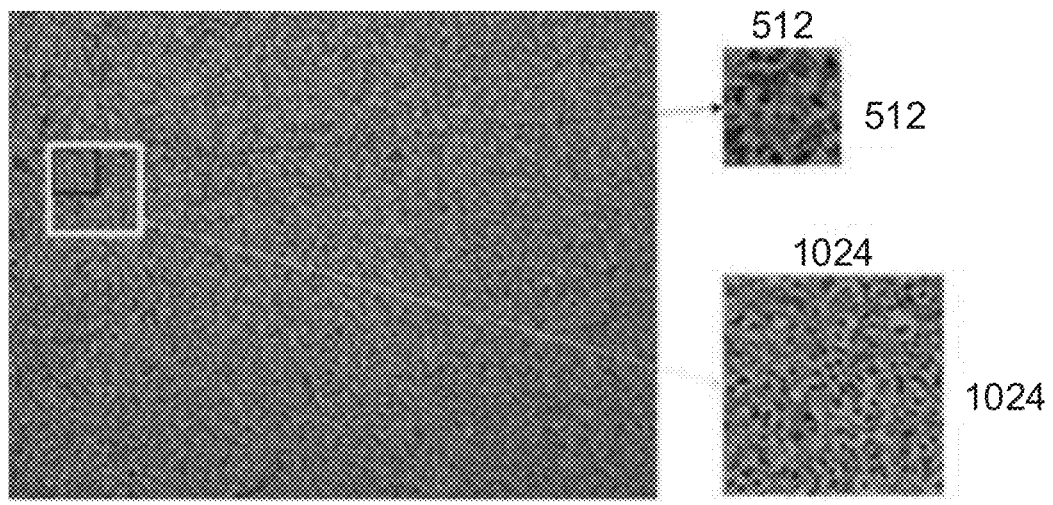
FIG. 3 is a representative view of two pathological images of different sizes, according to some embodiments of the present invention.

In some embodiments, the snippet obtaining module 12 is configured to extract the one or more analysis images from the pathological image through a moving or sliding window. As an example, to obtain two analysis images of two different sizes, a user can use a pre-configured sliding window (e.g., with multiple corresponding snippet sizes) to obtain a first snippet (e.g., analysis image), such as with a size of 512×512, and a second snippet with a size of 1024×1024, such as with a degree of overlap set at 10% for one or both of the analysis images. Accordingly, FIG. 3 is a representative view of two analysis images of different sizes, taken from the same pathological image, according to some embodiments of the present invention. In some examples, the pathological image and/or the snippet is two-dimensional or three-dimensional.

Returning to FIG. 1B, in various embodiments, the model selecting module 16 is configured to provide a user with a plurality of trained detection models (e.g., selectable trained detection models). In various examples, the outputting module 14 is configured to determine the tumor identification result based on at least the one or more classification features (which may also be referred to as characteristic features). In some examples, the model selecting module 16 is configured to select a trained detection model from plurality of (multiple) trained detection models to obtain the one or more classification features. For example, each selected trained detection model is configured to determine one or more classification features. In certain examples, the analyzing module 13 is configured to control or use the one or more selected trained detection models to obtain the one or more classification features, such as by analyzing the obtained one or more snippets and/or the pathological image directly. In certain embodiments, when a user selects a detection model set (may also be referred to as a group of detection models), such as via the model selecting module 16, the user selects one or more selected trained detection models included in the selected detection model set.

Figure 2B:
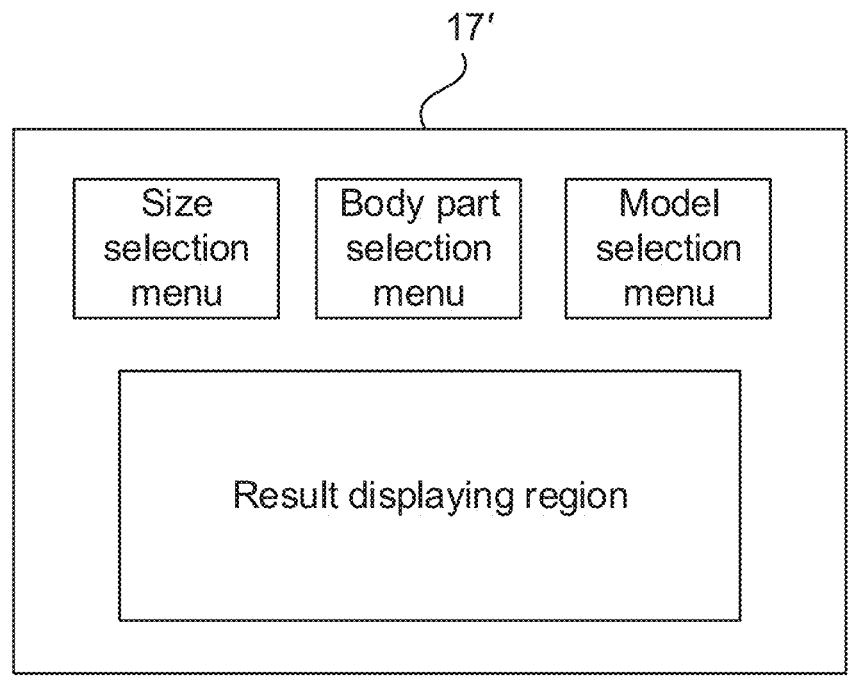
FIG. 2B is a simplified diagram showing another interface, according to some embodiments of the present invention.

FIG. 2B is a simplified diagram showing another interface 17', according to some embodiments of the present invention. This diagram is merely an example, which should not unduly limit the scope of the claims. One of ordinary skill in the art would recognize many variations, alternatives, and modifications. In some examples, the interface 17' includes a size selection menu, a model selection menu, a result displaying region, and a body selection menu. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. In various embodiments, the body selection menu is configured to enable a user to input a selected body part. In some embodiments, each detection model set corresponds to a different body part, wherein a user can select a detection model set by selecting a body part (e.g., a head, a chest, an abdomen, a pelvic cavity), such as using the model selecting module 16 and/or the body selection menu in the interface 17'.

In certain embodiments, a user can select different detection model sets for each human body parts, which can use different algorithms in determining a tumor in an image. In certain examples, a user can select a body part via the interface 17', such as via the body part selection menu, and select a detection model set via the model selecting module 16 (e.g., via the model selection menu on an interface), such as based on the selected body part. In some examples, each trained detection model is constructed based on a deep learning model, such as a convolutional neural network model, such as YOLO, Fast R-CNN, UNet, VNet, or FCN.

In some examples, each trained detection model corresponds to one or more sizes, such as one or more snippet sizes. In certain examples, the snippet obtaining module is configured to receive the selected detection model set selected by the user in the model selecting module 16, determine the specified one or more sizes of the analysis images, and extract the one or more analysis images of the corresponding one or more sizes from the pathological image of the tissue to be examined according to the sizes specified.

In various examples, after a user determines the detection model set, one or more trained detection model is determined, and the snippet obtaining module 12 is configured to extract the one or more analysis images of the corresponding one or more sizes according to the user requirement, wherein the analyzing module 13 is configured to control the one or more selected trained detection models to analyze the one or more analysis images to obtain the one or more classification features, wherein each trained detection model is configured to determine one or more classification features. For example, each trained detection model is configured to determine one classification feature.

Figure 4A:
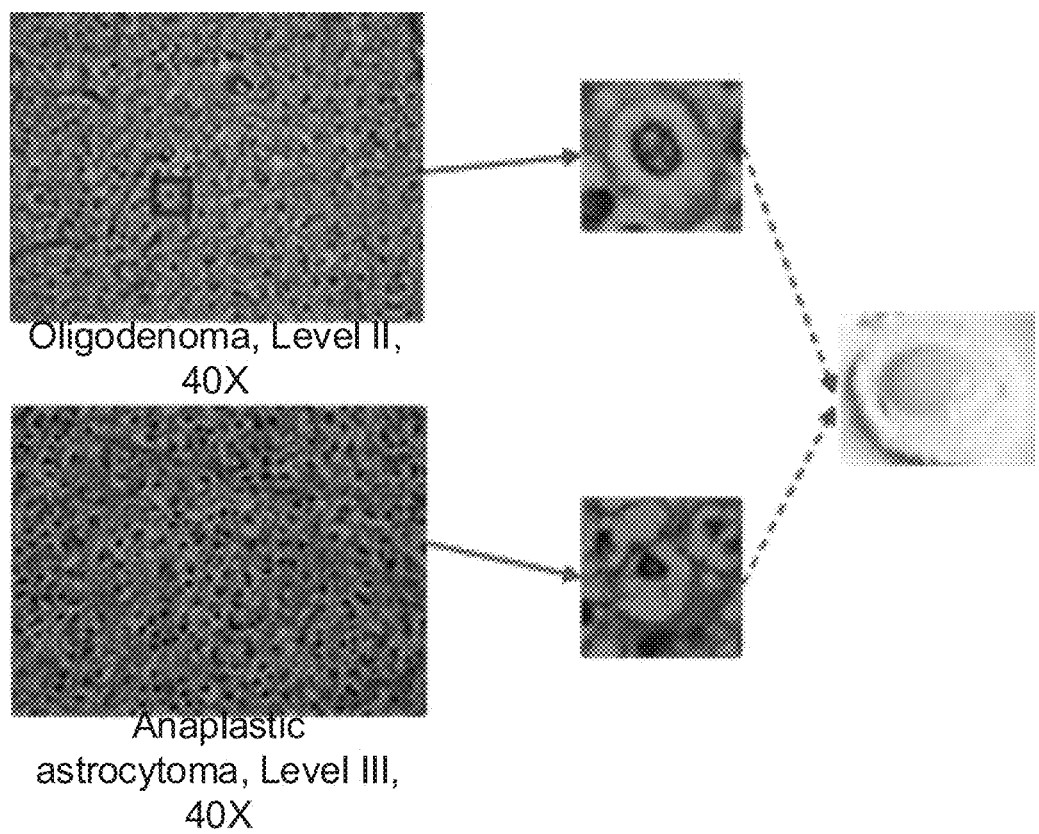
FIG. 4A is a representative view of an "egg-shaped" cell, according to some embodiments of the present invention.
Figure 4B:
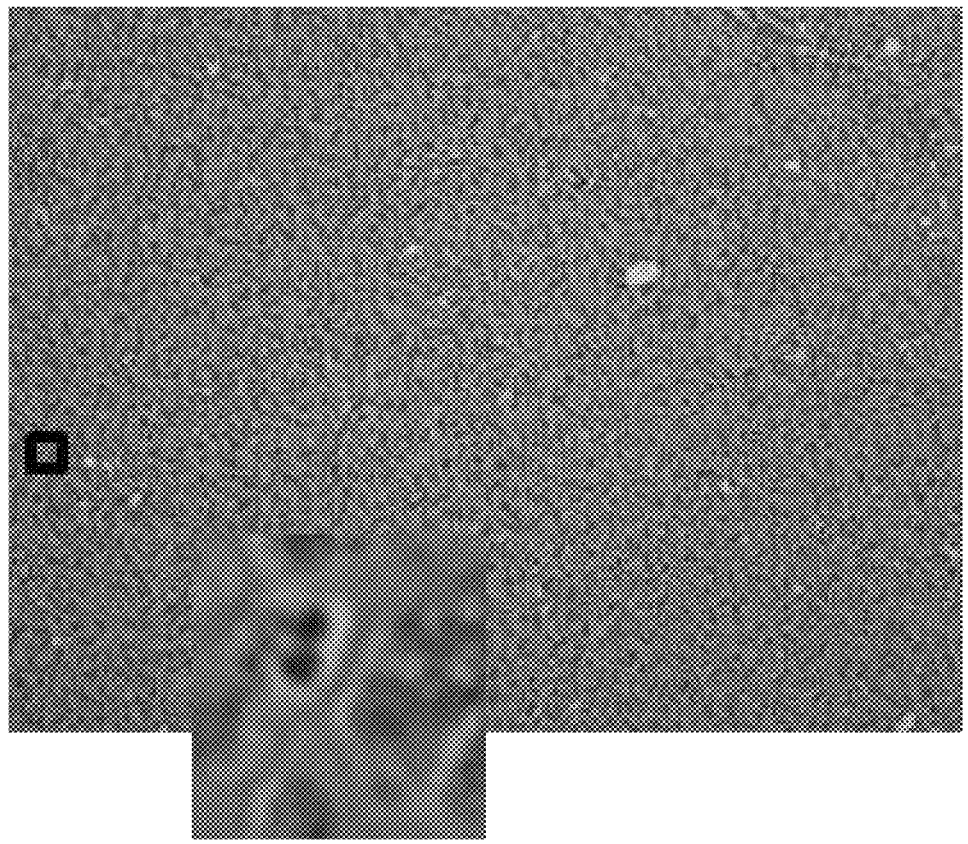
FIG. 4B is a representative view of nuclear division, according to some embodiments of the present invention.
Figure 4C:
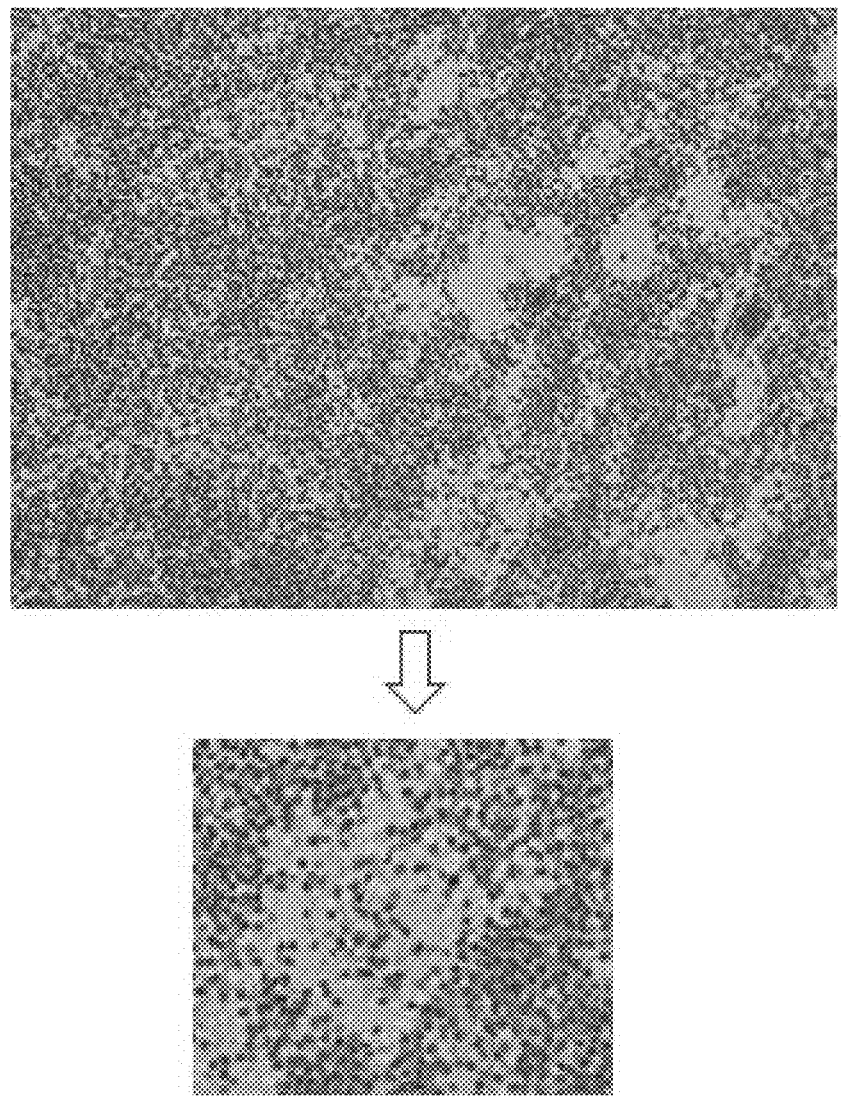
FIG. 4C is a representative view of cell necrosis, according to some embodiments of the present invention.
Figure 4D:
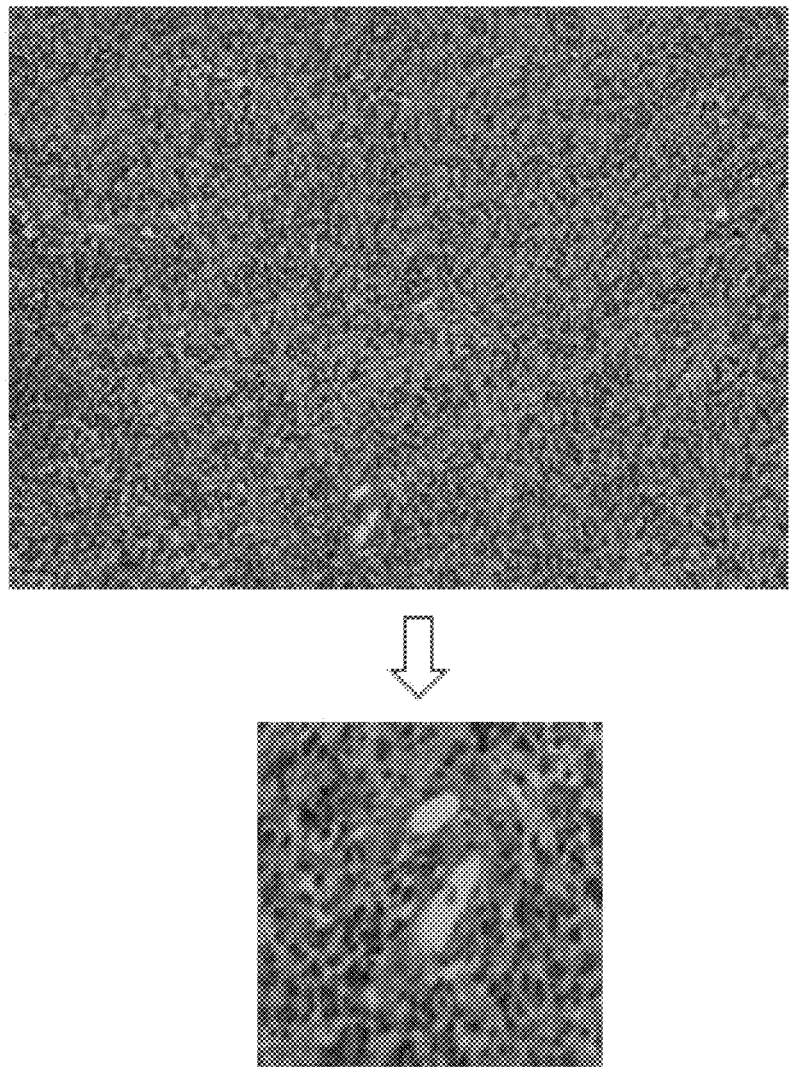
FIG. 4D is a representative view of proliferation of vascular endothelial cells, according to some embodiments of the present invention.

In various embodiments, brain glioma includes one or more cell classification features such as egg-shaped cell units, nuclear division, cell necrosis, and proliferation of vascular endothelial cells. FIG. 4A is a representative view of an egg-shaped cell, according to some embodiments of the present invention. FIG. 4B is a representative view of nuclear division (e.g., mitotic or non-mitotic), according to some embodiments of the present invention. FIG. 4C is a representative view of cell necrosis, according to some embodiments of the present invention. FIG. 4D is a representative view of proliferation of vascular endothelial cells, according to some embodiments of the present invention.

In some examples, when a detection model set includes a trained detection model and a user selects two analysis images of two sizes (e.g., analysis sizes) for analysis, the analyzing module is configured to input the two analysis images into the trained detection model, wherein the trained detection model is configured to receive and analyze the analysis images and output an identification result, such as based on at least one or more classification features identified in the analysis images. In certain examples, the one or more classification features includes egg-shaped cell units (e.g., at least a certain quantity), nuclear division, cell necrosis, and/or vascular endothelial cell proliferation. In various examples, a selected trained detection model is configured to analyze a small-sized snippet to determine the presence of egg-shaped cells (e.g., in respect to a certain quantity) and nuclear division, whereas the same selected trained detection model or another selected trained detection model is configured to analyze a large-sized snippet to determine the presence of cell necrosis and/or vascular endothelial cell proliferation.

In various embodiments, a selected trained detection model set includes a first selected trained detection model, a second selected trained detection model, a third selected trained detection mode, and a fourth selected trained detection model. In certain examples, the selected trained detection model set is configured to analyze two analysis images of two sizes, wherein the two analysis images are, in some examples, extracted from the same pathological image. In some examples, the first selected trained detection model is configured to analyze a first analysis image having a small-size to determine whether the first analysis image includes one or more egg-shaped cell units. In some examples, the second selected trained detection model is configured to analyze the first analysis image having the small-size to determine whether the second analysis image includes mitotic nuclear division events. In some examples, the third selected trained detection model is configured to analyze the first analysis image having the small-size to determine whether the second analysis image includes non-mitotic nuclear division events. In some examples, the fourth selected trained detection model is configured to analyze a second analysis image having the large-size to determine the presence of cell necrosis and/or vascular endothelial cell proliferation. In various examples, each selected trained detection model, or the selected trained detection models collectively, is configured to output an identification result corresponding to one or more classification features.

Figure 4E:
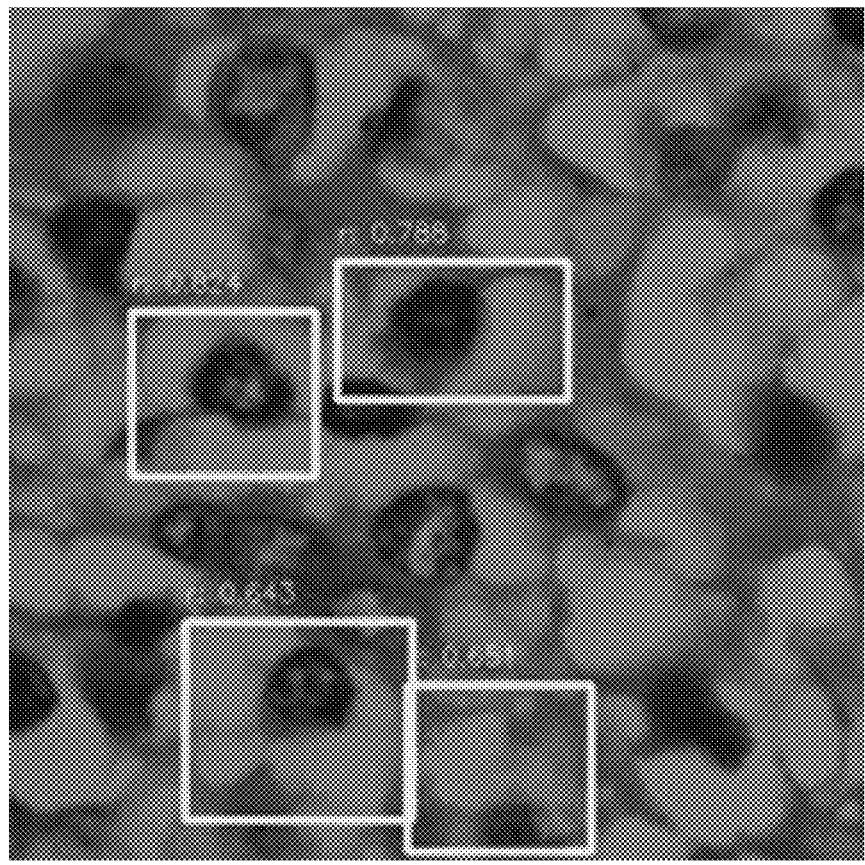
FIG. 4E is a representative view of an Oligodendroglioma, according to some embodiments of the present invention.
Figure 4F:
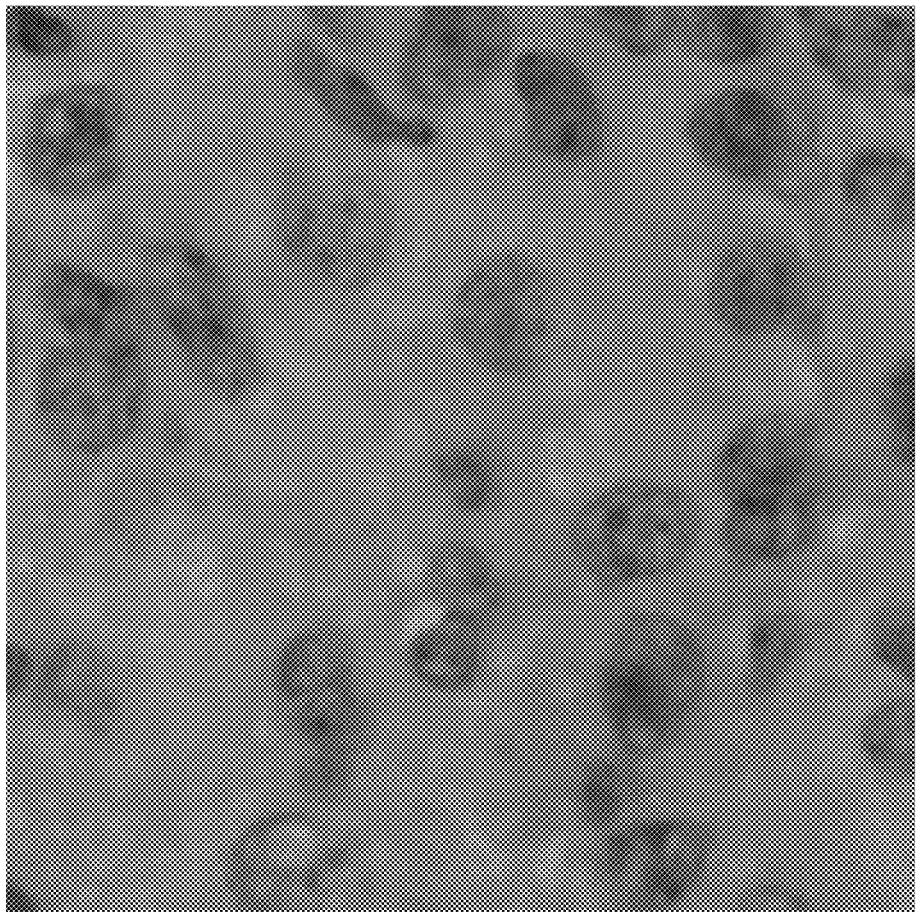
FIG. 4F is a representative view of Astrocytoma, according to some embodiments of the present invention.

In various embodiments, an identification result includes a tumor identification result, which in some examples, includes a tumor type (which may be referred to as tumor category) and/or a tumor class (which may be referred to as tumor stage, or tumor grade, a tumor level). In some examples, the identification result and/or the tumor identification result is determined based on one or more features detected. As an example, in a use case for determining brain glioma, the tumor identification result includes a tumor type selected from a group consisting of Oligodendroglioma (e.g., as shown in FIG. 4E) and Astrocytoma (e.g., as shown in FIG. 4F). Further using the use case for determining brain glioma as an example, the tumor class is selected from a group consisting of Oligodendroglioma (e.g., WHO Class II, for more information, please refer to the World Health Organization central nervous system tumor classification method) and anaplastic Oligodendroglioma, Astrocytoma (e.g., WHO Class II), Glioblastoma (e.g., WHO Class IV), and anaplastic Astrocytoma (e.g., WHO Class III).

Further using the use case for determining brain glioma as an example, the outputting module 14 is configured to receive the tumor identification result based on the one or more classification characteristics determined by the analyzing module 13. In certain examples, when a certain quantity (e.g., greater than a certain threshold quantity) of egg-shaped cell units (as a classification feature) are identified, the outputting module 14 is configured to determine the tumor identification result to include a tumor type being Oligodendroglioma. In some examples, when the quantity of egg-shaped cell units (as a classification feature) identified is low (e.g., below a certain threshold quantity), the outputting module 14 is configured to determine the tumor identification result to include a tumor type being Astrocytoma. In various examples, when a certain quantity (e.g., beyond a certain threshold quantity) of egg-shaped cell units (as a classification feature) are identified, and that no phenomenon of cell necrosis and vascular endothelial cell proliferation are recognized, the outputting module 14 is configured to determine the tumor identification result to be Oligodendroglioma. In various examples, when a certain quantity (e.g., beyond a certain threshold quantity) of egg-shaped cell units (as a classification feature) are identified, and that phenomenon of cell necrosis and/or vascular endothelial cell proliferation is recognized, the outputting module 14 is configured to determine the tumor identification result to be anaplastic (or variable) Oligodendroglioma.

In some embodiments, when the quantity of egg-shaped cell units recognized is below a threshold value, no nuclear division event is recognized, and that no phenomenon of cell necrosis or vascular endothelial cell proliferation is recognized, the outputting module 14 is configured to determine a tumor identification result to be Astrocytoma (WHO Class II). In some embodiments, when the quantity of egg-shaped cell units recognized is below a threshold value, no nuclear division event is recognized, and that phenomenon of cell necrosis and/or vascular endothelial cell proliferation is recognized, the outputting module 14 is configured to determine a tumor identification result to be Glioblastoma. In some embodiments, when the quantity of egg-shaped cell units recognized is below a threshold value, one or more nuclear division events is recognized, and that phenomenon of cell necrosis and/or vascular endothelial cell proliferation is recognized, the outputting module 14 is configured to determine a tumor identification result to be Glioblastoma (WHO Class IV). In some embodiments, when the quantity of egg-shaped cell units recognized is below a threshold value, one or more nuclear division events is recognized, and that phenomenon of cell necrosis and vascular endothelial cell proliferation are not recognized, the outputting module 14 is configured to determine a tumor identification result to be anaplastic Astrocytoma (WHO Class III).

In some embodiments, the outputting module 14 is configured to output the tumor recognition or identification result, which in various examples, includes a tumor type and/or a tumor class. In certain examples, the tumor identification result is displayed in a result display region of an interface (e.g., interface 17 or 17'), which can help a doctor to understand the identification result quickly and clearly.

In certain embodiments, the technical solutions provided by the system for grading a tumor help reduce issues associated with determining a tumor type relying on the experience of a doctor, such as low accuracy. In contrast, in various embodiments, the proposed system is configured to automatically classify or determine the type and/or class of a tumor in a pathological image.

Figure 5:
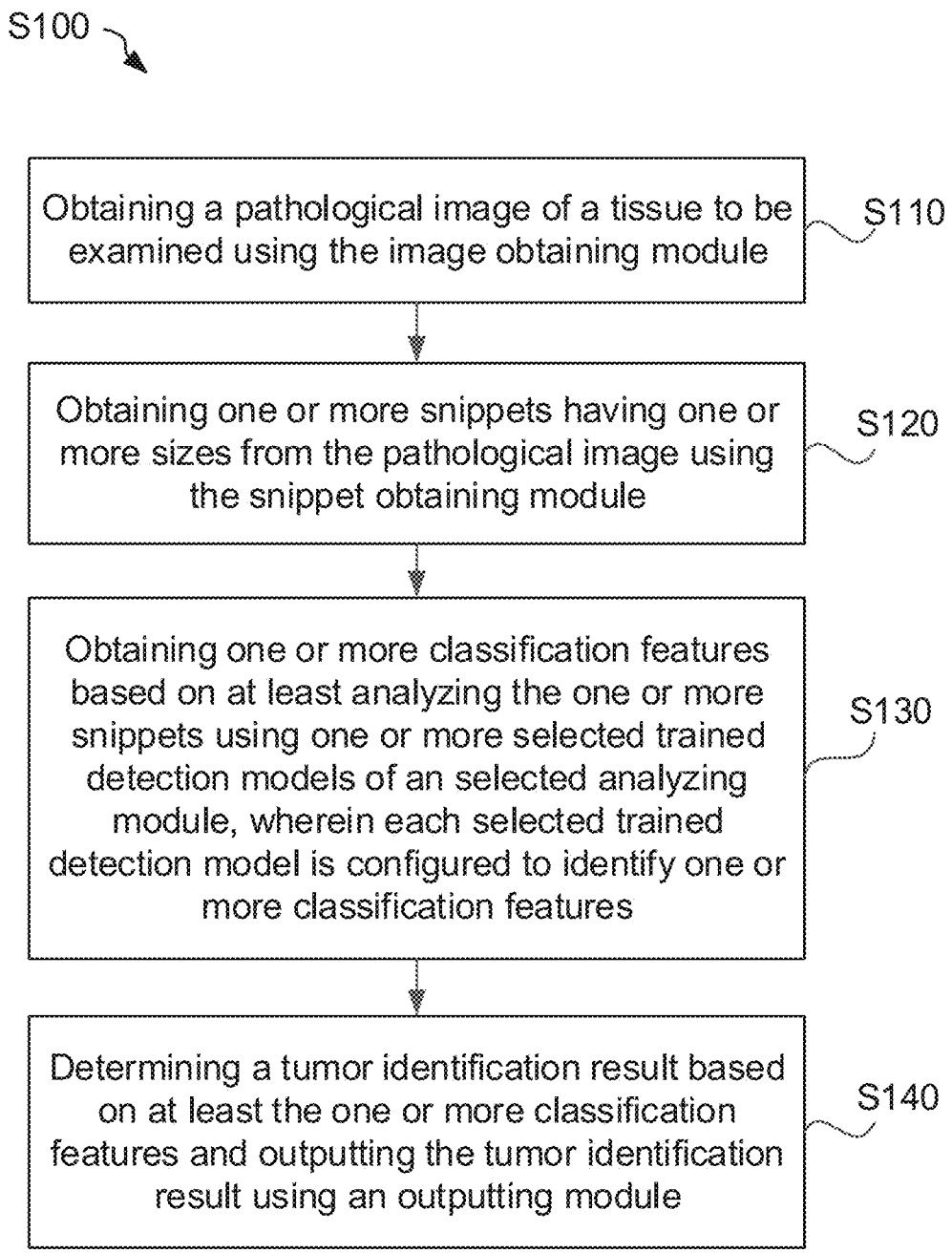
FIG. 5 is a simplified diagram showing a method for grading a tumor, according to some embodiments of the present invention.

FIG. 5 is a simplified diagram showing a method S100 for determining (e.g., automatically) a tumor, according to some embodiments of the present invention. This diagram is merely an example, which should not unduly limit the scope of the claims. One of ordinary skill in the art would recognize many variations, alternatives, and modifications. In some examples, the method S100 includes a process S110 of obtaining a pathological image of a tissue to be examined using the image obtaining module, a process S120 of obtaining one or more snippets having one or more sizes from the pathological image using the snippet obtaining module, a process S130 of obtaining one or more classification features based on at least analyzing the one or more snippets using one or more selected trained detection models of an selected analyzing module, wherein each selected trained detection model is configured to identify one or more classification features, and a process S140 of determining a tumor identification result based on at least the one or more classification features and outputting the tumor identification result (e.g., including a tumor type and/or a tumor class) using an outputting module. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. In some embodiments, the method S100 is implemented by a system (e.g., system 10) for grading a tumor an/or implemented by appropriate software and/or hardware.

In various embodiments, the process S110 of obtaining a pathological image of a tissue to be examined using the image obtaining module (e.g., image obtaining module 11) includes storing the pathological image into a storage module (e.g., storage module 15) of the system for grading a tumor. In some examples, the process S110 of obtaining a pathological image of a tissue to be examined using the image obtaining module 11 includes obtaining the pathological image of the tissue to be examined using a microscopic device of the image obtaining module 11. In certain examples, the process S110 includes staining or dying a biopsy slice and placing the stained slice into the microscopic device (e.g., onto a micro-motion observation platform) for examination using the microscopic device (e.g., one having a photographing function) to obtain the pathological image.

In certain embodiments, the process S110 includes controlling the microscopic device to photograph tumor slices based on at least traversal movement to obtain a pathological image. In certain examples, different pathological images may be obtained have overlapping regions (e.g., of a human body). In certain examples, the system for grading a tumor includes an image reading module and/or an image splicing module for reading or receiving a pathological image of the tissue to be examined from the image obtaining module 11, and then storing the pathological image into the storage module 15. In some examples, the image splicing module is configured to use a preset image splicing algorithm based on feature extraction to splice the full large-scale pathological image include multiple snippets, which can be smaller than the image.

In various embodiments, the process S120 includes using the snippet obtaining module 12 to obtain the one or more snippets having the one or more sizes by moving (e.g., sliding) an acquisition window on the pathological image. In certain examples, moving the acquisition window includes moving multiple sliding windows of multiple sizes, such as sequentially. In some examples, obtaining snippets having different sizes help improve tumor recognition efficiency and/or accuracy. For example, analyzing a snippet having a large-size enables analyzing of greater quantity of classification features, which in some examples, can increase accuracy but may reduce efficiency; whereas, analyzing a snippet having a small-size enables analyzing of lesser quantity of classification features, which in some examples, can decrease accuracy but may increase efficiency.

As an example, in a use case of analyzing two analysis images of two sizes, a small-size with an image block obtained with an overlap of 10% and a size of 512×512 from a full pathological image (e.g., using a preset sliding window) and a large-size with an image block obtained with an overlap of 10% and a size of 1024×1024 from the full pathological image, as shown in FIG. 3. In some examples, the degree of overlap and image block size can be changed.

In various embodiments, the process S130 includes extracting the one or more snippets (analysis images) having corresponding one or more sizes (e.g., using the snippet obtaining module 12) according to a user input. In certain embodiments, the analyzing module 13 is configured to use one or more selected trained detection models (e.g., selected by the user) to analyze the one or more snippets to obtain one or more classification features. In some examples, each selected trained detection model is configured to determine one or more classification features. For example, each selected trained detection model is configured to determine one classification feature.

In various embodiments, the process S140 includes receiving or obtaining the one or more classification features and generating a tumor identification result based on at least the one or more classification features. In certain examples, the tumor identification result includes a tumor type and/or a tumor class.

In some examples, the process S140 includes displaying or outputting (e.g., using the outputting module 14) the tumor identification result in an interface (e.g., interface 17 or interface 17'), such as in the result displaying region. In certain examples, the process S140 further includes outputting and/or displaying the one or more classification features, such as alongside the tumor identification result, which may help a doctor to clearly and/or efficiently see the relationship between the tumor identification result and the one or more classification characteristics to provide explanatory and persuasive analysis logic beneficial to the doctor.

Figure 6:
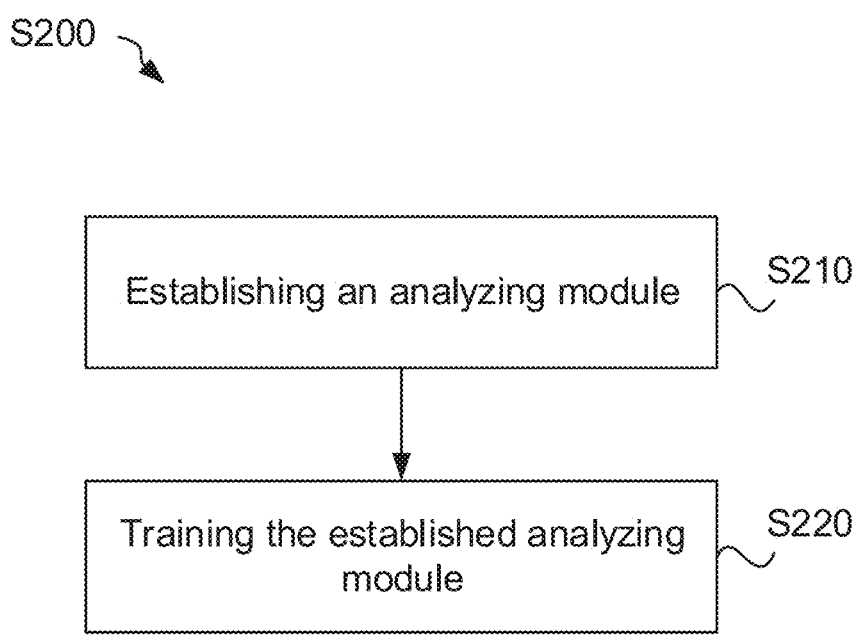
FIG. 6 is a simplified diagram showing a method for training an analyzing module, according to some embodiments of the present invention.

FIG. 6 is a simplified diagram showing a method S200 for training an analyzing module, according to some embodiments of the present invention. This diagram is merely an example, which should not unduly limit the scope of the claims. One of ordinary skill in the art would recognize many variations, alternatives, and modifications. In some examples, the method S200 includes a process S210 of establishing an analyzing module and a process S220 of training the established analyzing module. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, a detection model, such as a trained detection model, such as a selected trained detection model is constructed based on deep learning algorithms, such as YOLO, Fast R-CNN, UNet, VNet, and FCN algorithms of convolutional neural networks. In some embodiments, a detection model set, such as a trained detection model set, such as a selected trained detection model set includes multiple detection models constructed based on a YOLO algorithm. In certain embodiments, a detection model is configured to first perform feature extraction on an input analysis image using a feature extraction network (e.g., neural network), obtaining a feature map with a fixed size (e.g., m×m), dividing the analysis image into m×m grid cells (which may also be referred to as grid units), and if a central coordinate of a target in the ground truth with the correct marking falls in one of the grid cells, the grid cell is used to predict or analyze the target.

In some examples, each grid unit has a fixed number of borders, for example, 3 borders in a YOLO v3-based model, where only the largest border standard in the gold standard (IOU) is used to predict the target. In various examples, the gold standard is interpreted as follows: in supervised learning, data is marked appearing in the form of (x, t), where x is the input data and t is the marking. Gold standard is when a correct marking is assigned to t, and not a gold standard when a wrong marking is assigned to t. In certain examples, coordinates of a border can be predicted by the following formula:

$$b_x = \sigma(t_x) + c_x$$

$$b_y = \sigma(t_y) + c_y$$

$$b_\omega = p_\omega e^{t_\omega}$$

$$b_h = p_h e^{t_h}$$

where $t_x$, $t_y$, $t_w$, $t_h$ represent the predicted outputs of a detection model; $c_x$ and $c_y$ represents he coordinates of the grid units, for example, $c_x$ is zero and $c_y$ is one when representing a grid unit in row zero and column one; $p_w$, $p_h$ represent the sizes of predicted front borders; and $b_x$, $b_y$, $b_w$, $b_h$ represent the center coordinates of the predicted borders and the sizes of the predicted borders.

In various embodiments, before training a detection model, a corresponding image size and a corresponding classification feature are determined. For example, each detection model corresponds to one classification feature and two image sizes. In some embodiments, such as for determining brain glioma, five trained detection models are established (e.g., in process S210) to identify their corresponding classification features.

In some examples, the process S220 includes receiving diagnostic inputs from multiple pathologists (e.g., experienced pathologists), which in some examples, includes one or more manually marked classification features for each diagnosed pathological image. In some examples, the diagnostic inputs are performed on $N_1$ sheets of small-size analysis images with a size of 512×512 containing one or more classification features and/or $N_2$ sheets of large-size analysis images with a size of 1024×1024 containing one or more classification features, such as obtained from a pathological image through one or more sliding windows in an interface. In certain examples, the process S220 includes inputting the small-size analysis images and/or the large-size analysis images into corresponding one or more trained detection models to identify one or more classification features. In various examples, the one or more trained detection model corresponds to one or more classification features, such that a system for grading a tumor is configured to select and use the one or more trained detection models to determine or identify one or more classification features, which, in certain examples, can then be used to determine a tumor identification result.

In various embodiments, a non-transitory computer-readable medium with instructions stored thereon, that when executed by a processor, perform the processes including: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module.

In various embodiments, a system for grading a tumor includes an image obtaining module configured to obtain a pathological image of a tissue to be examined; a snippet obtaining module configured to obtain one or more snippets having one or more sizes from the pathological image; an analyzing module configured to obtain one or more classification features based on at least analyzing the one or more snippets using one or more selected trained detection models of the analyzing module, wherein each selected trained detection model is configured to identify one or more classification features; and an outputting module configured to determine a tumor identification result based on at least the one or more classification features and output the tumor identification result. In some examples, the system is implemented according to at least the system 10 of FIG. 1A and/or the system 10' of FIG. 1B. In certain examples, the system is configured to perform at least the method S100 of FIG. 5 and/or the method S200 of FIG. 6.

In some embodiments, the snippet obtaining module is configured to obtain one or more snippets having one or more sizes from the pathological image based on at least one or more input or specified sizes.

In some embodiments, the system further includes a model selecting module configured to provide one or more detection model sets each including one or more trained detection models. In some examples, the analyzing module is configured to use a selected detection model set selected from the one or more detection model sets for obtaining the one or more classification features, the selected detection model set including the one or more selected trained detection models, each of the one or more classification features corresponding to one of the one or more selected trained detection models.

In some embodiments, the model selecting module is further configured to select the selected detection model set from the one or more detection model sets based on at least an input or specified body part.

In some embodiments, the snippet obtaining module is further configured to: determine the one or more sizes of the one or more snippets based on at least one of the one or more selected trained detection models; and obtain the one or more snippets having the determined one or more sizes from the pathological image.

In some embodiments, the snippet obtaining module is further configured to receive size information associated with the one or more selected trained detection models from the analyzing module; determine the one or more sizes of the one or more snippets based on at least the one or more selected trained detection models; obtain the one or more snippets having the determined one or more sizes from the pathological image; and output the obtained one or more snippets to the analyzing module.

In some embodiments, the snippet obtaining module includes a microscopic device.

In some embodiments, the analyzing module is configured to obtain a first classification feature (e.g., egg-shaped cell or nuclear division) associated with a first snippet of a first size using a first trained detection model; and to obtain a second classification feature (e.g., cell necrosis or vascular endothelial cell proliferation) associated with a second snippet of a second size using a second trained detection model, the second size being larger than the first size.

In some embodiments, the tumor identification result includes at least one selected from a group consisting of a tumor type and a tumor class.

In some examples, the system further includes a model training module configured to: receive a training image having at least a first training snippet of a first size and a second training snippet of a second size; receive one or more classification features associated with the training image, the one or more classification features includes a first classification feature associated with the first training snippet of the first size and a second classification feature associated with the second training snippet of the second size; and train one or more detection models based at least in part on the one or more classification features to generate the one or more trained detection models; wherein a first trained detection model of the one or more trained detection models corresponds to the first classification feature and the first size; and wherein a second trained detection model of the one or more trained detection models corresponds to the second classification feature and the second size.

In various embodiments, a computer-implemented method for grading a tumor includes: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module. In some examples, the method is implemented according to at the method S100 of FIG. 5. In certain examples, the method is implemented by at least the system 10 of FIG. 1A and/or the system 10' of FIG. 1B.

In some embodiments, the method further includes obtaining one or more snippets having one or more sizes from the pathological image using the snippet obtaining module based on at least one or more input or specified sizes.

In some embodiments, obtaining one or more classification features based on at least analyzing the one or more snippets using one or more selected trained detection models of an analyzing module includes: selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

In some embodiments, the method further includes selecting the detection model set based on at least an input or specified body part using the model selecting module.

In some embodiments, the method further includes determining the one or more sizes of the one or more snippets based on at least one of the one or more selected trained detection models; and obtaining the one or more snippets having the determined one or more sizes from the pathological image.

In some embodiments, the method further includes receiving size information associated with the one or more selected trained detection models from the analyzing module; determining the one or more sizes of the one or more snippets based on at least the one or more selected trained detection models; obtaining the one or more snippets having the determined one or more sizes from the pathological image; and outputting the obtained one or more snippets to the analyzing module.

In some embodiments, determining a tumor identification result based on at least the one or more classification features and outputting the tumor identification result using an outputting module includes: determining the tumor identification result including at least one selected from a group consisting of a tumor type and a tumor class based on at least the one or more classification features and outputting the tumor identification result using the outputting module.

In various embodiments, a non-transitory computer-readable medium with instructions stored thereon, that when executed by a processor, perform the processes including: obtaining a pathological image of a tissue to be examined using an image obtaining module; obtaining one or more snippets having one or more sizes from the pathological image using a snippet obtaining module; obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module. In some examples, the non-transitory computer-readable medium with instructions stored thereon is implemented according to the method S100 of FIG. 5 and/or the method S200 of FIG. 6. In certain examples, the non-transitory computer-readable medium with instructions stored thereon is implemented by a computer (e.g., a terminal).

In some embodiments, the non-transitory computer-readable medium, when executed, further perform the process of obtaining one or more snippets having one or more sizes from the pathological image using the snippet obtaining module based on at least one or more input or specified sizes.

In some embodiments, obtaining one or more classification features based on at least analyzing the one or more snippets using one or more selected trained detection models of an analyzing module includes: selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

In some embodiments, the non-transitory computer-readable medium, when executed, further perform the process of selecting the selected detection model set based on at least an input or specified body part using the model selecting module.

In some embodiments, the non-transitory computer-readable medium, when executed, further perform the processes including: determining the one or more sizes of the one or more snippets based on at least one of the one or more selected trained detection models; and obtaining the one or more snippets having the determined one or more sizes from the pathological image.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for grading a tumor, the system comprising:
an image obtaining module configured to obtain a pathological image of a tissue to be examined;
a snippet obtaining module configured to obtain one or more snippets having one or more sizes from the pathological image;
an analyzing module configured to obtain one or more classification features based on at least analyzing the one or more snippets using one or more selected trained detection models of the analyzing module, wherein each selected trained detection model is configured to identify one or more classification features;
an outputting module configured to determine a tumor identification result based on at least the one or more classification features and output the tumor identification result;
a model selecting module configured to provide one or more detection model sets each including one or more trained detection models; and
wherein the analyzing module is configured to use a selected detection model set selected from the one or more detection model sets for obtaining the one or more classification features, the selected detection model set including the one or more selected trained detection models, each of the one or more classification features corresponding to one of the one or more selected trained detection models.

2. The system of claim 1, wherein the snippet obtaining module is configured to obtain one or more snippets having one or more sizes from the pathological image based on at least one or more input or specified sizes.

3. The system of claim 1, wherein the model selecting module is further configured to select the selected detection model set from the one or more detection model sets based on at least an input or specified body part.

4. The system of claim 3, wherein the snippet obtaining module is further configured to:
determine the one or more sizes of the one or more snippets based on at least one of the one or more selected trained detection models; and
obtain the one or more snippets having the determined one or more sizes from the pathological image.

5. The system of claim 3, wherein the snippet obtaining module is further configured to:
receive size information associated with the one or more selected trained detection models from the analyzing module;

determine the one or more sizes of the one or more snippets based on at least the one or more selected trained detection models;

obtain the one or more snippets having the determined one or more sizes from the pathological image; and output the obtained one or more snippets to the analyzing module.

6. The system of claim 1, wherein the snippet obtaining module includes a microscopic device.

7. The system of claim 1, wherein the analyzing module is configured to:

obtain a first classification feature associated with a first snippet of a first size using a first trained detection model, the first classification feature is egg-shaped cell or nuclear division; and obtain a second classification feature associated with a second snippet of a second size using a second trained detection model, the second size being larger than the first size, the second classification feature is cell necrosis or vascular endothelial cell proliferation.

8. The system of claim 1, wherein the tumor identification result includes at least one selected from a group consisting of a tumor type and a tumor class.

9. The system of claim 1, further includes a model training module configured to:

receive a training image having at least a first training snippet of a first size and a second training snippet of a second size;

receive one or more classification features associated with the training image, the one or more classification features includes a first classification feature associated with the first training snippet of the first size and a second classification feature associated with the second training snippet of the second size; and train one or more detection models based at least in part on the one or more classification features to generate the one or more trained detection models;

wherein a first trained detection model of the one or more trained detection models corresponds to the first classification feature and the first size; and wherein a second trained detection model of the one or more trained detection models corresponds to the second classification feature and the second size.

10. A computer-implemented method for grading a tumor, the method comprising:

obtaining a pathological image of a tissue to be examined using an image obtaining module;

obtaining one or more snippets having one or more sizes from the pathological image using a snippet obtaining module;

obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module;

wherein the obtaining one or more classification features based on at least analyzing the one or more snippets using one or more selected trained detection models of an analyzing module includes:

selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

11. The method of claim 10, further including:

obtaining one or more snippets having one or more sizes from the pathological image using the snippet obtaining module based on at least one or more input or specified sizes.

12. The method of claim 10, further including:

selecting the detection model set based on at least an input or specified body part using the model selecting module.

13. The method of claim 12, further including:

determining the one or more sizes of the one or more snippets based on at least one of the one or more selected trained detection models; and obtaining the one or more snippets having the determined one or more sizes from the pathological image.

14. The method of claim 12, further including:

receiving size information associated with the one or more selected trained detection models from the analyzing module;

determining the one or more sizes of the one or more snippets based on at least the one or more selected trained detection models;

obtaining the one or more snippets having the determined one or more sizes from the pathological image; and outputting the obtained one or more snippets to the analyzing module.

15. The method of claim 10, wherein the determining a tumor identification result based on at least the one or more classification features and outputting the tumor identification result using an outputting module includes:

determining the tumor identification result including at least one selected from a group consisting of a tumor type and a tumor class based on at least the one or more classification features and outputting the tumor identification result using the outputting module.

16. A non-transitory computer-readable medium with instructions stored thereon, that when executed by a processor, perform the processes including:

obtaining a pathological image of a tissue to be examined using an image obtaining module;

obtaining one or more snippets having one or more sizes from the pathological image using a snippet obtaining module;

obtaining one or more classification features based on at least analyzing the one or more snippets using one or more selected trained detection models of an analyzing module, wherein each selected trained detection model is configured to identify one or more classification features; and determining a tumor identification result based on at least the identified one or more classification features and outputting the tumor identification result using an outputting module;

wherein the obtaining one or more classification features based on at least analyzing the one or more snippets using one or more selected trained detection models of an analyzing module includes:

selecting a selected detection model set from one or more detection model sets each including one or more trained detection models using a model selecting module, the selected detection model set including the one or more selected trained detection models; and obtaining the one or more classification features each corresponding to one of the one or more selected trained detection models using the analyzing module.

17. The non-transitory computer-readable medium of claim 16, when executed, further perform the process of:

obtaining one or more snippets having one or more sizes from the pathological image using the snippet obtaining module based on at least one or more input or specified sizes.

* * * * *